US012489933B2

(12) United States Patent
Shimezawa et al.

(10) Patent No.: US 12,489,933 B2
(45) Date of Patent: Dec. 2, 2025

(54) INFORMATION PROCESSING DEVICE, INFORMATION PROCESSING METHOD, AND INFORMATION PROCESSING SYSTEM

(71) Applicant: Sony Group Corporation, Tokyo (JP)

(72) Inventors: Kazuyuki Shimezawa, Tokyo (JP); Natsuki Itaya, Tokyo (JP); Ayumi Kobayashi, Tokyo (JP); Mitsuru Katsumata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 154 days.

(21) Appl. No.: 18/567,364

(22) PCT Filed: Feb. 28, 2022

(86) PCT No.: PCT/JP2022/008256

§ 371 (c)(1),
(2) Date: Dec. 6, 2023

(87) PCT Pub. No.: WO2022/264536

PCT Pub. Date: Dec. 22, 2022

(65) Prior Publication Data

US 2025/0119597 A1 Apr. 10, 2025

(30) Foreign Application Priority Data

Jun. 15, 2021 (JP) ................................ 2021-099543

(51) Int. Cl.

| | |
|---|---|
| ***H04N 21/233*** | (2011.01) |
| ***H04N 21/2187*** | (2011.01) |
| ***H04N 21/24*** | (2011.01) |

(52) U.S. Cl.

CPC ....... *H04N 21/233* (2013.01); *H04N 21/2187* (2013.01); *H04N 21/2408* (2013.01)

(58) Field of Classification Search

CPC ............. H04N 21/233; H04N 21/2187; H04N 21/2408

See application file for complete search history.

(56) References Cited

U.S. PATENT DOCUMENTS

2009/0067349 A1 3/2009 Glueckman
2014/0007147 A1* 1/2014 Anderson .......... H04N 21/6582 725/9

(Continued)

FOREIGN PATENT DOCUMENTS

EP 2867849 B1 4/2019
JP 2003-235027 A 8/2003

(Continued)

OTHER PUBLICATIONS

International Search Report and Written Opinion mailed on May 10, 2022, received for PCT Application PCT/JP2022/008256, filed on Feb. 28, 2022, 8 pages including English Translation.

*Primary Examiner* — Nicholas T Corbo
(74) *Attorney, Agent, or Firm* — XSENSUS LLP

(57) ABSTRACT

There is provided an information processing device that distributes live data to a first user (terminal device $\mathbf{30}_1$), the information processing device performing control related to interaction data from the first user on the basis of information of a delay between the first user that transmits the interaction data with respect to the live data and the information processing device, or a delay between a second user (terminal device $\mathbf{30}_2$) that receives the interaction data from the first user with respect to the live data and the first user.

19 Claims, 10 Drawing Sheets

(56) References Cited

U.S. PATENT DOCUMENTS

| | | | | |
|---|---|---|---|---|
| 2019/0104235 | A1* | 4/2019 | Sarkar | H04N 21/47 |
| 2019/0246146 | A1 | 8/2019 | Bustamante | |

FOREIGN PATENT DOCUMENTS

| | | | |
|---|---|---|---|
| JP | 2017016535 | A | 1/2017 |
| JP | 2019-075604 | A | 5/2019 |
| JP | 6775557 | B2 | 10/2020 |
| WO | 2019/067112 | A1 | 4/2019 |
| WO | 2019/168637 | A1 | 9/2019 |

* cited by examiner

FIG.10

| 5QI Value | Resource Type | Default Priority Level | Packet Delay Budget (NOTE 3) | Packet Error Rate | Default Maximum Data Burst Volume (NOTE 2) | Default Averaging Window | Example Services |
|---|---|---|---|---|---|---|---|
| 1 | GBR (NOTE 1) | 20 | 100 ms (NOTE 11, NOTE 13) | $10^{-2}$ | N/A | 2000 ms | Conversational Voice |
| 2 | | 40 | 150 ms (NOTE 11, NOTE 13) | $10^{-3}$ | N/A | 2000 ms | Conversational Video (Live Streaming) |
| 3 | | 30 | 50 ms (NOTE 11, NOTE 13) | $10^{-3}$ | N/A | 2000 ms | Real Time Gaming, V2X messages (see TS 23.287 [121]). Electricity distribution -- medium voltage, Process automation monitoring |
| 4 | | 50 | 300 ms (NOTE 11, NOTE 13) | $10^{-6}$ | N/A | 2000 ms | Non-Conversational Video (Buffered Streaming) |
| 71 | | 56 | 150 ms (NOTE 11, NOTE 13, NOTE 15) | $10^{-6}$ | N/A | 2000 ms | "Live" Uplink Streaming (e.g. TS 26.238 [76]) |
| 5 | Non-GBR (NOTE 1) | 10 | 100 ms NOTE 10, NOTE 13) | $10^{-6}$ | N/A | N/A | IMS Signalling |
| 6 | | 60 | 300 ms (NOTE 10, NOTE 13) | $10^{-6}$ | N/A | N/A | Video (Buffered Streaming) TCP-based (e.g., www, e-mail, chat, ftp, p2p file sharing, progressive video, etc.) |
| 7 | | 70 | 100 ms (NOTE 10, NOTE 13) | $10^{-3}$ | N/A | N/A | Voice, Video (Live Streaming) Interactive Gaming |
| 8 | | 80 | 300 ms (NOTE 13) | $10^{-6}$ | N/A | N/A | Video (Buffered Streaming) TCP-based (e.g., www, e-mail, chat, ftp, p2p file sharing, progressive |
| 80 | | 68 | 10 ms (NOTE 5, NOTE 10) | $10^{-6}$ | N/A | N/A | Low Latency eMBB applications Augmented Reality |
| ... | ... | ... | ... | ... | ... | ... | ... |

FIG.12

| COMMUNICATION DELAY t | GROUP |
|---|---|
| T0 <= t <T1 | A |
| T1 <= t <T2 | B |
| T2 <= t <T3 | C |
| T3 <= t | D |

INFORMATION PROCESSING DEVICE, INFORMATION PROCESSING METHOD, AND INFORMATION PROCESSING SYSTEM

CROSS-REFERENCE TO RELATED APPLICATIONS

The present application is based on PCT filing PCT/JP2022/008256, filed Feb. 28, 2022, which claims priority from Japanese Patent Application No. 2021-099543, filed Jun. 15, 2021, the entire contents of each are incorporated herein by reference.

FIELD

The present disclosure relates to an information processing device, an information processing method, and an information processing system.

BACKGROUND

In recent years, an interactive distribution service has been used. For example, in recent years, an interactive remote live performance that enables user interaction with distributed live data has been used.

CITATION LIST

Patent Literature

Patent Literature 1: Japanese Patent Application Laid-open No. 2019-75604

SUMMARY

Technical Problem

Communication has a delay. Thus, in an interactive distribution service, there is a possibility that timing of interaction (such as cheer) is greatly shifted and a user feels strange, for example.

Thus, the present disclosure proposes an information processing device, an information processing method, and an information processing system that make it possible to provide a high-quality interactive distribution service.

Solution to Problem

In order to solve the above problem, an information processing device according to one embodiment of the present disclosure that distributes live data to a first terminal device, the information processing device includes: an acquisition unit that acquires information of a delay between the first terminal device that transmits interaction data with respect to the live data and the information processing device, or a delay between a second terminal device, which receives the interaction data from the first terminal device with respect to the live data, and the first terminal device; and a data control unit that performs control related to the interaction data from the first terminal device on a basis of the acquired information of the delay.

BRIEF DESCRIPTION OF DRAWINGS

FIG. 10 is a view illustrating a part of 5QI.

FIG. 12 is a view illustrating a correspondence relationship between groups and communication delays.

DESCRIPTION OF EMBODIMENTS

In the following, embodiments of the present disclosure will be described in detail on the basis of the drawings. Note that in each of the following embodiments, overlapped description is omitted by assignment of the same reference sign to the same parts.

In addition, in the present description and the drawings, a plurality of configurations having substantially the same functional configuration may be distinguished by assignment of different numbers after the same reference sign. For example, a plurality of configurations having substantially the same functional configuration is distinguished as terminal devices $\mathbf{30}_1$, $\mathbf{30}_2$, and $\mathbf{30}_3$ as necessary. However, in a case where it is not specifically necessary to distinguish the plurality of components having substantially the same functional configuration from each other, only the same reference sign is assigned. For example, in a case where it is not necessary to specifically distinguish the terminal devices $\mathbf{30}_1$, $\mathbf{30}_2$, and $\mathbf{30}_3$, the terminal devices $\mathbf{30}_1$, $\mathbf{30}_2$, and $\mathbf{30}_3$ are simply referred to as a terminal device 30.

1. OUTLINE OF THE PRESENT EMBODIMENT

In recent years, an interactive distribution service has been used. For example, in recent years, an interactive remote live performance that enables user interaction (such as cheer) with distributed live data has been used. Here, the live data is, for example, data of a real-time performance or broadcast.

However, communication has a delay. Thus, in the interactive distribution service, a user may feel strange with respect to the distribution depending on a state of the communication. For example, in the interactive remote live performance, a large shift may be generated in the interaction due to a communication delay based on a difference in communication environments or the like of users. This problem will be described below with reference to FIG. 1 and FIG. 2.

Figure 1:
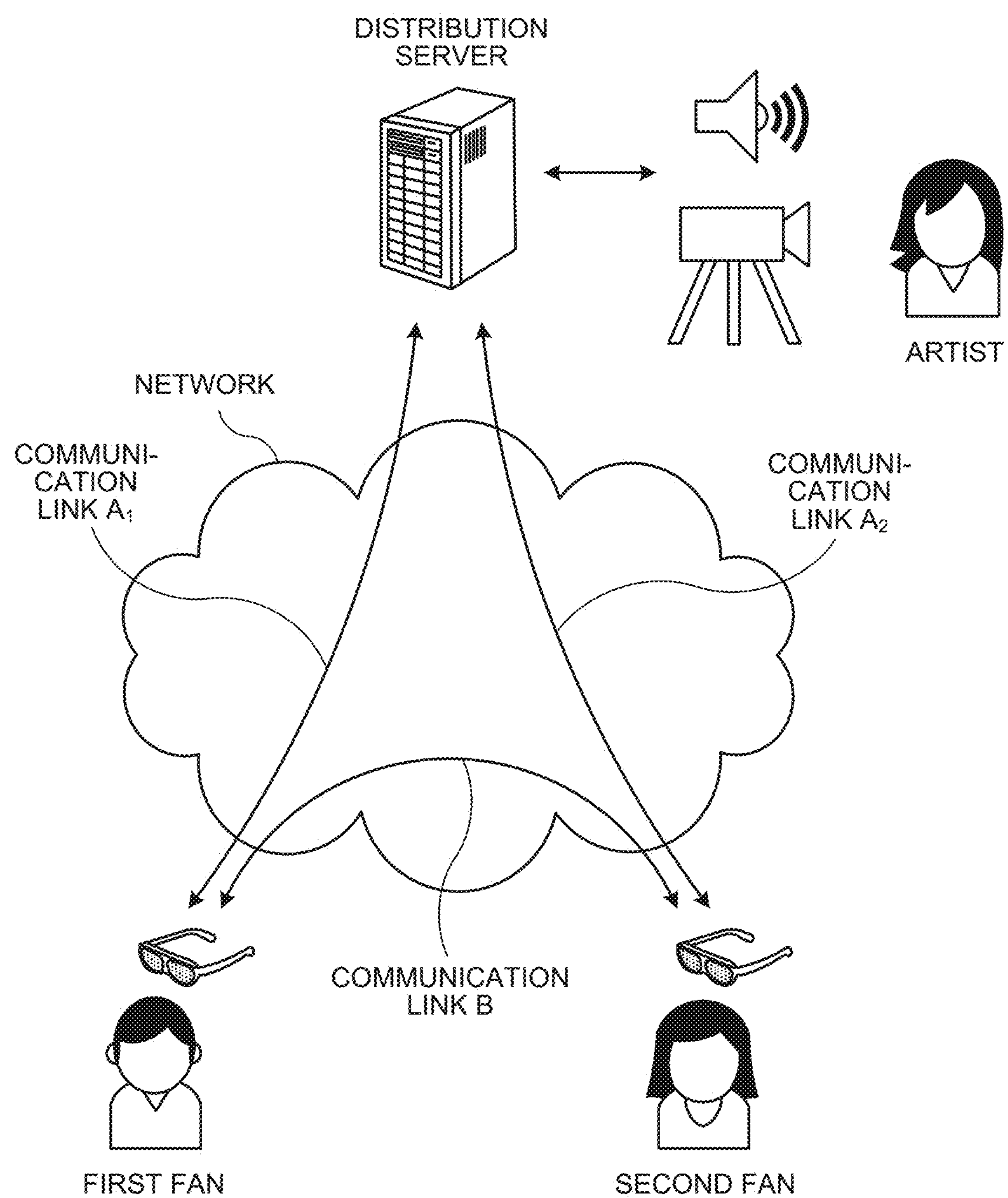
FIG. 1 is a view illustrating a configuration example of an interactive distribution system.

FIG. 1 is a view illustrating a configuration example of an interactive distribution system. In the example of FIG. 1, a terminal device (including an imaging device, a speaker, and a monitor) of an artist, a terminal device of a first fan, and a terminal device of a second fan are connected to a distribution server that distributes a performance video of the artist. The terminal device of the first fan and the distribution server are connected by a communication link $A_1$, and the terminal device of the second fan and the distribution server are connected by a communication link $A_2$. In addition, the terminal device of the first fan and the terminal device of the second fan are connected by a communication link B. Here, the communication links $A_1$, $A_2$, and B are links passing through a network such as the Internet, and have communication delays. Note that it is assumed that a communication delay between the terminal device of the artist and the distribution server is negligibly low. Furthermore, the communication delay between the terminal device of the artist and the distribution server may be included in the communication delays of the communication links.

Figure 2:
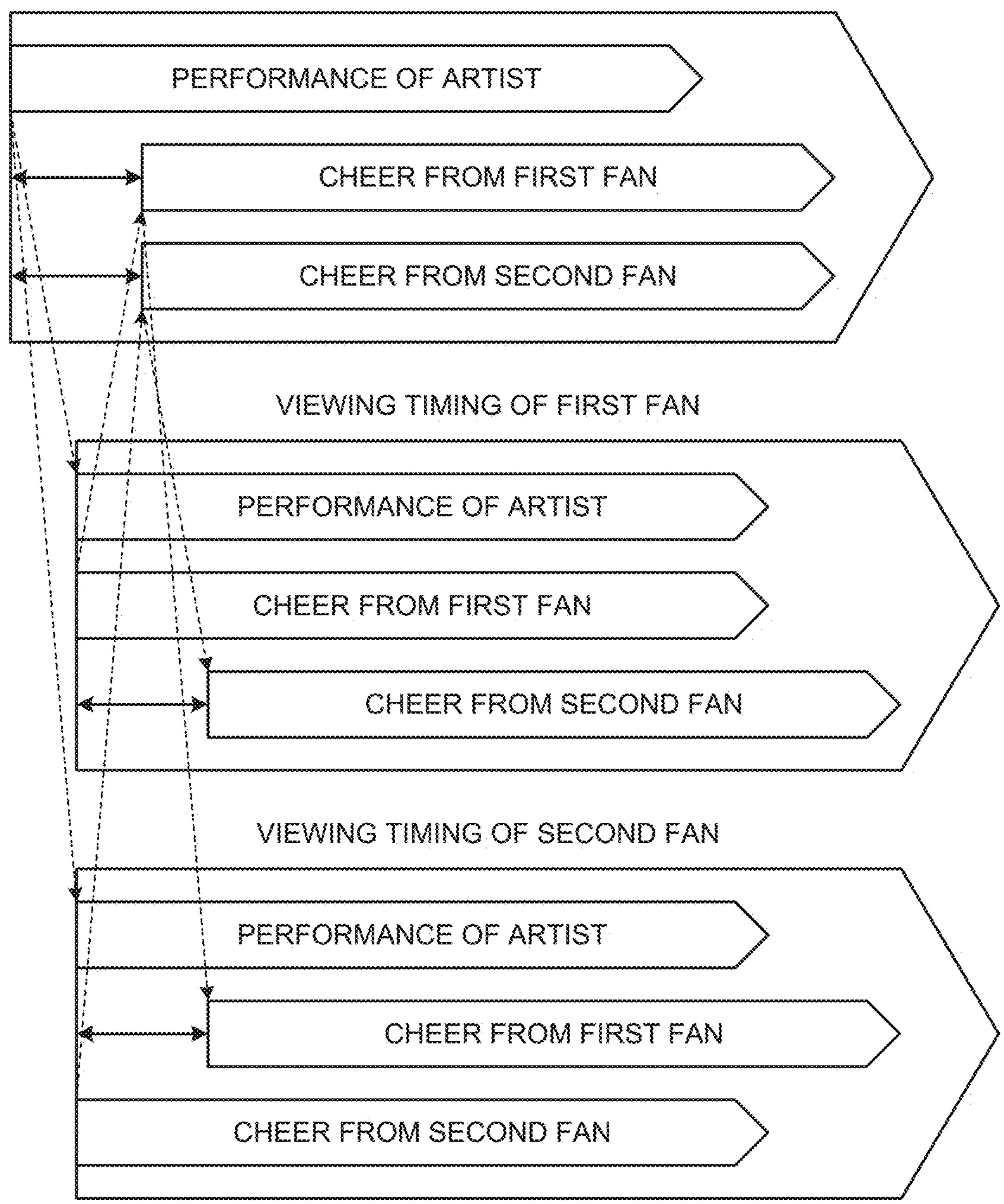
FIG. 2 is a view illustrating distribution timing and viewing timing of live data.

The distribution server distributes live data (such as a performance video of the artist) to the terminal devices of the first fan and the second fan by using the communication link $A_1$ or the communication link $A_2$. FIG. 2 is a view illustrating distribution timing and viewing timing of the live data. In the example of FIG. 2, interaction data (data of a cheer in the example of FIG. 2) is transmitted from each of the terminal devices of the first fan and the second fan to the distribution server. The distribution server that receives the data of the cheer transmits the received data to the terminal device of the artist. Furthermore, the distribution server distributes the data of the cheer from the second fan to the terminal device of the first fan, and distributes the data of the cheer from the first fan to the terminal device of the second fan.

As described above, transmission of data via the network such as the Internet have a communication delay. In a case where the interaction data is transmitted via the network, an arrival of an interaction may be greatly shifted from originally intended timing due to the communication delay. In this case, an interaction (such as a cheer or handclap) is generated at timing greatly shifted from timing at which a live performance is excited, or the interaction is generated at various different timing. In the example of FIG. 2, the cheers from the first fan and the second fan which cheers reach the artist are at timing shifted from the performance of the artist. Furthermore, in the example of FIG. 2, the cheer from the second fan which cheer reaches the first fan is at timing greatly shifted from the performance of the artist. Furthermore, in the example of FIG. 2, the cheer from the first fan which cheer reaches the second fan is at timing greatly shifted from the performance of the artist.

In a state in a manner illustrated in FIG. 2, a large cheer is generated at timing shifted from originally intended timing (such as timing at which the performance is excited), whereby a user feels strange at the live performance. As a result, the user cannot effectively feel the remote live performance.

Thus, in the present embodiment, the above problem is solved by the following means.

For example, the distribution server appropriately controls the live data of the artist and the interaction data from each user according to the communication delay with the artist, the user, and another user. As a result, the artist and the users can experience immersive feeling as if participating in the live performance even in the remote live performance.

Furthermore, the distribution server controls volume in the interaction data from each of the users according to the communication delay between each of the users and the artist. For example, the distribution server makes volume of a user close to the distribution server (with a low delay) large and volume of a user far from the distribution server (with a long delay) small. As a result, it is possible to experience immersive feeling as if the artist is having a live performance at a large-scale facility such as a dome, a stadium, or an arena.

Furthermore, the terminal device performs excitement sharing control between the users according to the communication delay between the users. For example, the terminal devices of the users with a low delay directly exchange the interaction data without the distribution server. As a result, it is possible to share the excitement timely.

The outline of the present embodiment has been described above. An information processing system 1 according to the present embodiment will be described in detail in the following.

2. CONFIGURATION OF THE INFORMATION PROCESSING SYSTEM

First, an overall configuration of the information processing system 1 will be described.

Figure 3:
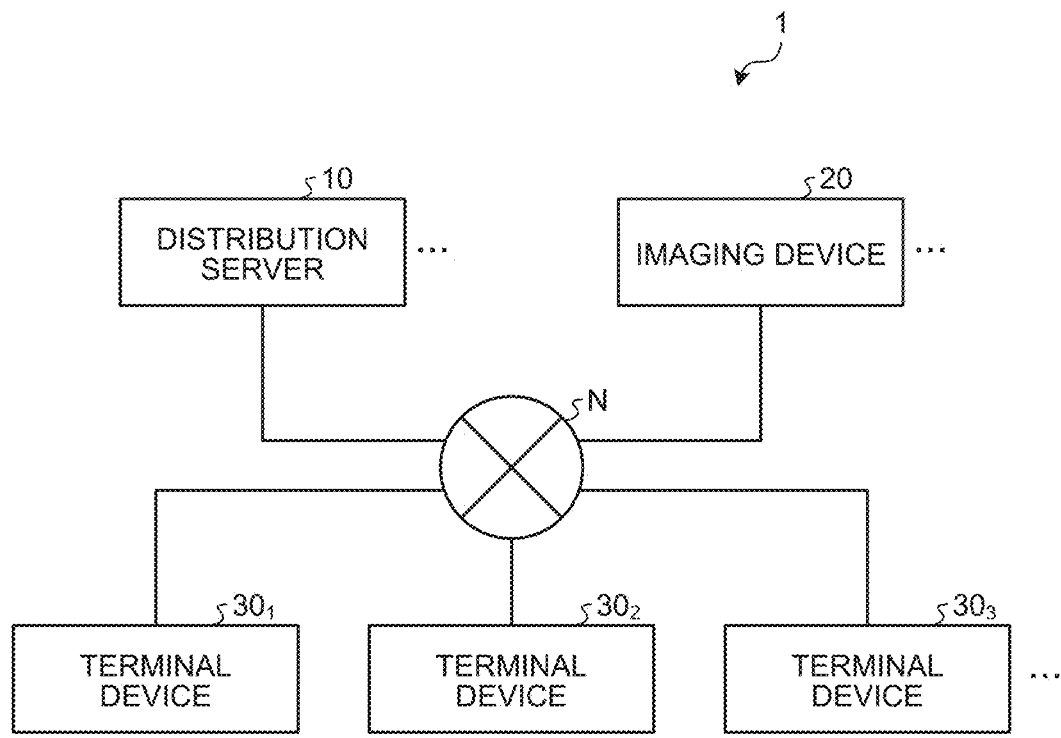
FIG. 3 is a view illustrating a configuration example of an information processing system according to an embodiment of the present disclosure.

FIG. 3 is a view illustrating a configuration example of the information processing system 1 according to the embodiment of the present disclosure. The information processing system 1 is a system to provide a user located in a local space with a sense of being in a remote space. The information processing system 1 includes a distribution server 10, an imaging device 20, and a terminal device 30. Note that the devices in the drawing may be considered as devices in a logical sense. That is, a part of the devices in the drawing may be realized by a virtual machine (VM), a container, a docker, or the like, and may be implemented on the same hardware physically.

The distribution server 10, the imaging device 20, and the terminal device 30 each of which has a communication function are connected via a network N. The distribution server 10, the imaging device 20, and the terminal device 30 can be rephrased as communication devices. Note that although only one network N is illustrated in the example of FIG. 3, there may be a plurality of the networks N.

Here, the network N is a communication network such as a local area network (LAN), a wide area network (WAN), a cellular network, a fixed telephone network, a regional Internet protocol (IP) network, or the Internet. The network N may include a wired network or a wireless network. In addition, the network N may include a core network. The core network is, for example, an evolved packet core (EPC) or a 5G core network (5GC). In addition, the network N may include a data network other than the core network. The data network may be a service network of a telecommunications carrier, such as an IP multimedia subsystem (IMS) network. Furthermore, the data network may be a private network such as an intra-company network.

The communication devices such as the distribution server 10, the imaging device 20, and the terminal device 30 may be configured to be connected to the network N or another communication device by utilization of a radio access technology (RAT) such as long term evolution (LTE), new radio (NR), Wi-Fi, or Bluetooth (registered trademark). At this time, the communication devices may be configured to be able to use different radio access technologies. For example, the communication devices may be configured to be able to use NR and Wi-Fi. Furthermore, the communication devices may be configured to be able to use different cellular communication technologies (such as LTE and NR). LTE and NR are types of the cellular communication technology, and enable mobile communication of the communication devices by an arrangement of a plurality of areas, each of which is covered by a base station, in a cellular manner.

Note that the communication devices such as the distribution server 10, the imaging device 20, and the terminal device 30 may be connectable to the network N or another communication device by utilization of a radio access technology other than LIE, NR, Wi-Fi, or Bluetooth. For example, the communication devices may be connectable to the network N or another communication device by utilization of low power wide area (LPWA) communication. Furthermore, the communication devices may be connectable to the network N or another communication device by utilization of wireless communication of a proprietary standard. Obviously, the communication devices may be connectable to the network N or another communication device by utilization of wireless communication of another known standard.

Hereinafter, a configuration of each device including the information processing system 1 will be specifically described. Note that the configuration of each device described in the following is merely an example. The configuration of each device may be different from the following configuration.

<2-1. Configuration of a Server>

First, a configuration of the distribution server 10 will be described.

The distribution server 10 is an information processing device (computer) that distributes live data (such as a performance video of an artist) to one or a plurality of terminal devices 30. The terminal device 30 to which the distribution server 10 distributes data may include a terminal device used by the artist. At this time, the distribution server 10 may transmit interaction data from a terminal device 30 used by a fan to the terminal device 30 used by the artist.

Any form of computer can be employed as the distribution server 10. For example, the distribution server 10 may be a PC server, a mid-range server, or a mainframe server. Furthermore, the distribution server 10 may be an information processing device that performs data processing (edge processing) near the user or the terminal (such as an edge server connected to a base station arranged in a local NW including the terminal or a core network device connected to the base station). For example, the distribution server 10 may be an information processing device (computer) provided on a side of or built in a base station or a roadside machine. Obviously, the distribution server 10 may be an information processing device that performs cloud computing.

Figure 4:
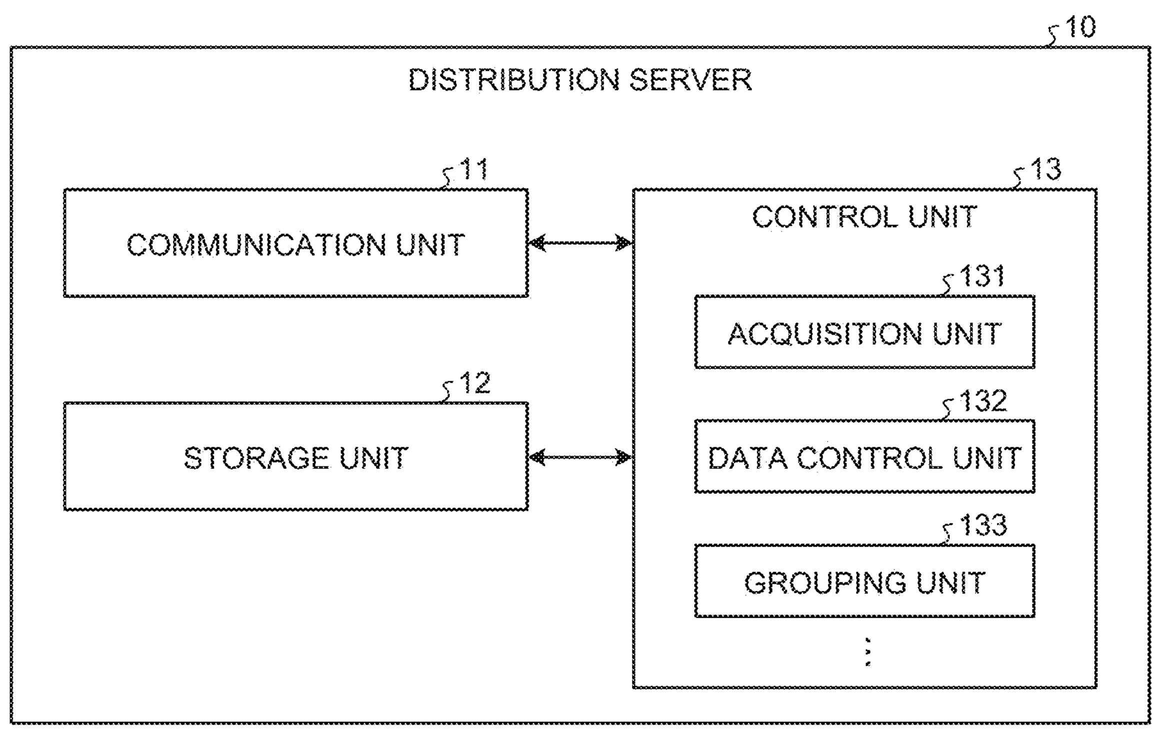
FIG. 4 is a view illustrating a configuration example of a distribution server according to the embodiment of the present disclosure.

FIG. 4 is a view illustrating a configuration example of the distribution server 10 according to the embodiment of the present disclosure. The distribution server 10 includes a communication unit 11, a storage unit 12, and a control unit 13. Note that the configuration illustrated in FIG. 4 is a functional configuration, and a hardware configuration may be different therefrom. Furthermore, functions of the distribution server 10 may be implemented in a manner of being distributed in a plurality of physically-separated configurations. For example, the distribution server 10 may include a plurality of server devices.

The communication unit 11 is a communication interface for communicating with other devices. For example, the communication unit 11 is a local area network (LAN) interface such as a network interface card (NIC). The communication unit 11 may be a wired interface or a wireless interface. The communication unit 11 communicates with the imaging device 20, the terminal device 30, and the like under the control of the control unit 13.

The storage unit 12 is a data readable/writable storage device such as a dynamic random access memory (DRAM), a static random access memory (SRAM), a flash memory, or a hard disk. The storage unit 12 functions as a storage unit of the distribution server 10.

Returning to FIG. 4, the control unit 13 is a controller that controls each unit of the distribution server 10. The control unit 13 is realized by, for example, a processor such as a central processing unit (CPU), a micro processing unit (MPU), or a graphics processing unit (GPU). For example, the control unit 13 is realized by the processor executing various programs, which are stored in the storage device inside the distribution server 10, by using a random access memory (RAM) or the like as a work area. Note that the control unit 13 may be realized by an integrated circuit such as an application specific integrated circuit (ASIC) or a field programmable gate array (FPGA). Any of the CPU, the MPU, the GPU, the ASIC, and the FPGA can be regarded as a controller.

The control unit 13 includes an acquisition unit 131, a data control unit 132, and a grouping unit 133. Each of the blocks (the acquisition unit 131 to the grouping unit 133) included in the control unit 13 is a functional block indicating a function of the control unit 13. These functional blocks may be software blocks or hardware blocks. For example, each of the above-described functional blocks may be one software module realized by software (including a microprogram), or may be one circuit block on a semiconductor chip (die). Obviously, each of the functional blocks may be one processor or one integrated circuit. The control unit 13 may be configured in units of functions different from the above-described functional blocks. A configuration method of the functional blocks is arbitrary.

Note that the control unit 13 may be configured in functional units different from the above-described functional blocks. Furthermore, some or all of the operations of the blocks (the acquisition unit 131 to the grouping unit 133) included in the control unit 13 may be performed by another device. For example, some or all of the operations of the blocks included in the control unit 13 may be performed by the control unit 23 of the imaging device 20 or the control unit 33 of the terminal device 30. The operation of each of the blocks included in the control unit 13 will be described later.

<2-2. Configuration of the Imaging Device>

Next, a configuration of the imaging device 20 will be described.

The imaging device 20 is an information processing device (computer) having an imaging function. The imaging device 20 is installed, for example, in a performance venue of the artist, and transmits a captured performance video of the artist to the distribution server 10. Note that the imaging device 20 may be regarded as the terminal device 30 possessed by the artist.

Figure 5:
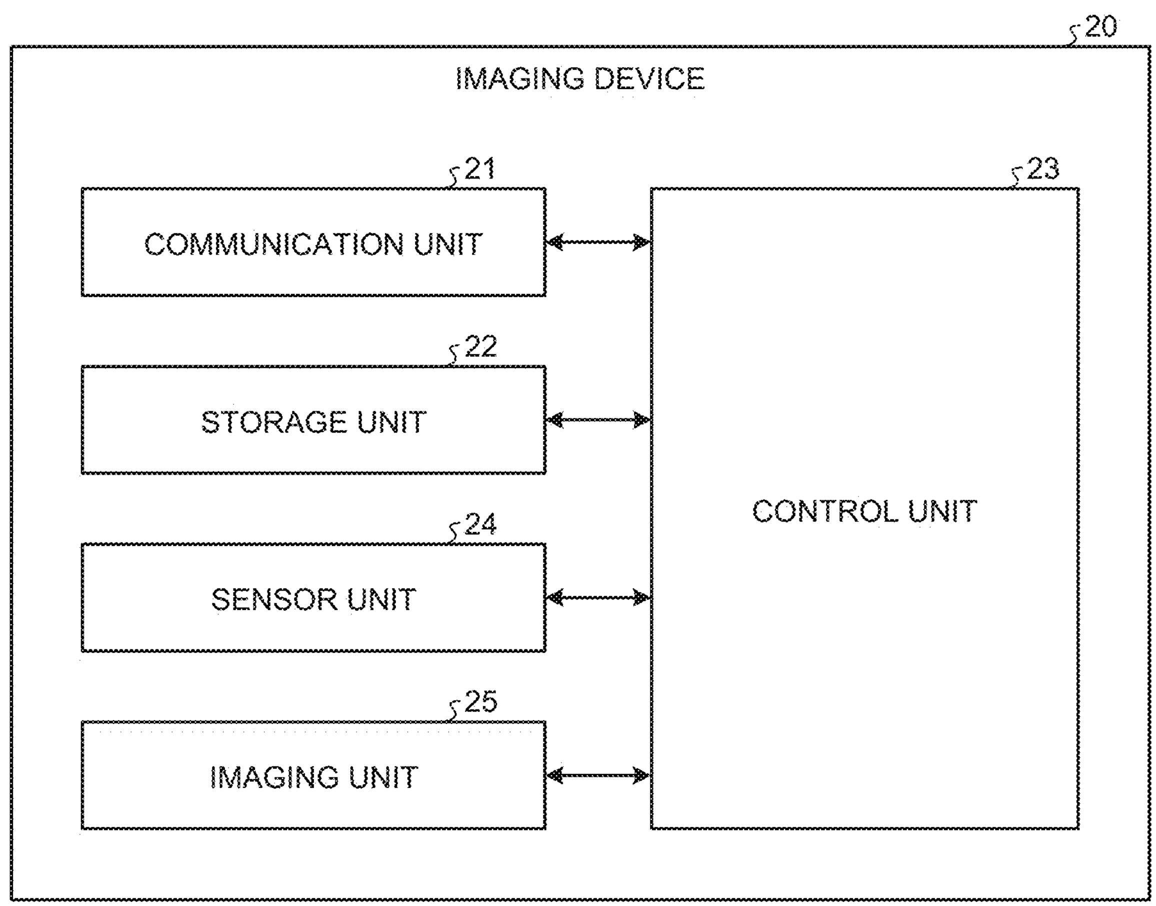
FIG. 5 is a view illustrating a configuration example of an imaging device according to the embodiment of the present disclosure.

FIG. 5 is a view illustrating a configuration example of the imaging device 20 according to the embodiment of the present disclosure. The imaging device 20 includes a communication unit 21, a storage unit 22, a control unit 23, a sensor unit 24, and an imaging unit 25. Note that the configuration illustrated in FIG. 5 is a functional configuration, and a hardware configuration may be different therefrom. Furthermore, functions of the imaging device 20 may be implemented in a manner of being distributed in a plurality of physically-separated configurations.

The communication unit 21 is a communication interface for communicating with other devices. For example, the communication unit 21 is a LAN interface such as an NIC. The communication unit 21 may be a wired interface or a wireless interface.

In a case where the communication unit 21 includes a wireless interface, the communication unit 21 may be configured to be connected to the network N by utilization of a wireless access technology such as LTE, NR, Wi-Fi, or Bluetooth (registered trademark). At this time, the communication devices may be configured to be able to use different radio access technologies. For example, the communication devices may be configured to be able to use NR and Wi-Fi. Furthermore, the communication devices may be configured to be able to use different cellular communication technologies (such as LTE and NR). In addition, the imaging device 20 may be connectable to the network N by utilization of a radio access technology other than LTE, NR, Wi-Fi, and Bluetooth.

The storage unit 22 is a data readable/writable storage device such as a DRAM, an SRAM, a flash memory, or a hard disk. The storage unit 22 functions as a storage unit of the imaging device 20. The storage unit 22 stores photographing data (such as image data or metadata) photographed by the imaging unit 25. Note that the photographing data may be in a file format.

The control unit 23 is a controller that controls each unit of the imaging device 20. The control unit 23 is realized by, for example, a processor such as a CPU, an MPU, or a GPU. For example, the control unit 23 is realized by the processor executing various programs, which are stored in the storage device inside the imaging device 20, by using a RAM or the like as a work area. Note that the control unit 23 may be realized by an integrated circuit such as an ASIC or FPGA. Any of the CPU, the MPU, the GPU, the ASIC, and the FPGA can be regarded as a controller.

The sensor unit 24 is a sensor that detects information related to a shooting venue. For example, the sensor unit 24 is a 3D sensor that detects a shape of the shooting venue, and a position, a shape, and the like of a person or an object in the shooting venue. At this time, the sensor unit 24 may be a time of flight (ToF) camera-type 3D sensor or a stereo camera-type 3D sensor.

The imaging unit 25 is a conversion unit that converts an optical image into an electric signal. The imaging unit 25 includes, for example, an image sensor, a signal processing circuit that processes an analog pixel signal output from the image sensor, and the like, and converts light entering from a lens into digital data (image data). Note that an image captured by the imaging unit 25 is not limited to a video (moving image), and may be a still image. Note that the imaging unit 25 can be rephrased as a camera.

<2-3. Configuration of the Terminal Device>

Next, a configuration of the terminal device 30 will be described.

The terminal device 30 is an information processing device configured to be able to communicate with the distribution server 10. For example, the terminal device 30 is an xR device such as an augmented reality (AR) device, a virtual reality (VR) device, or a mixed reality (MR) device. At this time, the xR device may be a glasses-type device such as AR glasses or MR glasses, or may be a head-mounted device such as a VR head-mounted display. In a case where the terminal device 30 is the xR device, the terminal device 30 may be a standalone device including only a user wearing portion (such as an eyeglass portion). Furthermore, the terminal device 30 may be a terminal interlocking device including a user wearing portion (such as the eyeglass portion) and a terminal portion interlocked with the portion (such as a smart device).

Note that the terminal device 30 may be a mobile terminal such as a mobile phone, a smart device (smartphone or tablet), a personal digital assistant (PDA), or a notebook PC. Furthermore, the terminal device 30 may be a wearable device such as a smart watch. In addition, the terminal device 30 may be a portable Internet of things (IoT) device.

Figure 6:
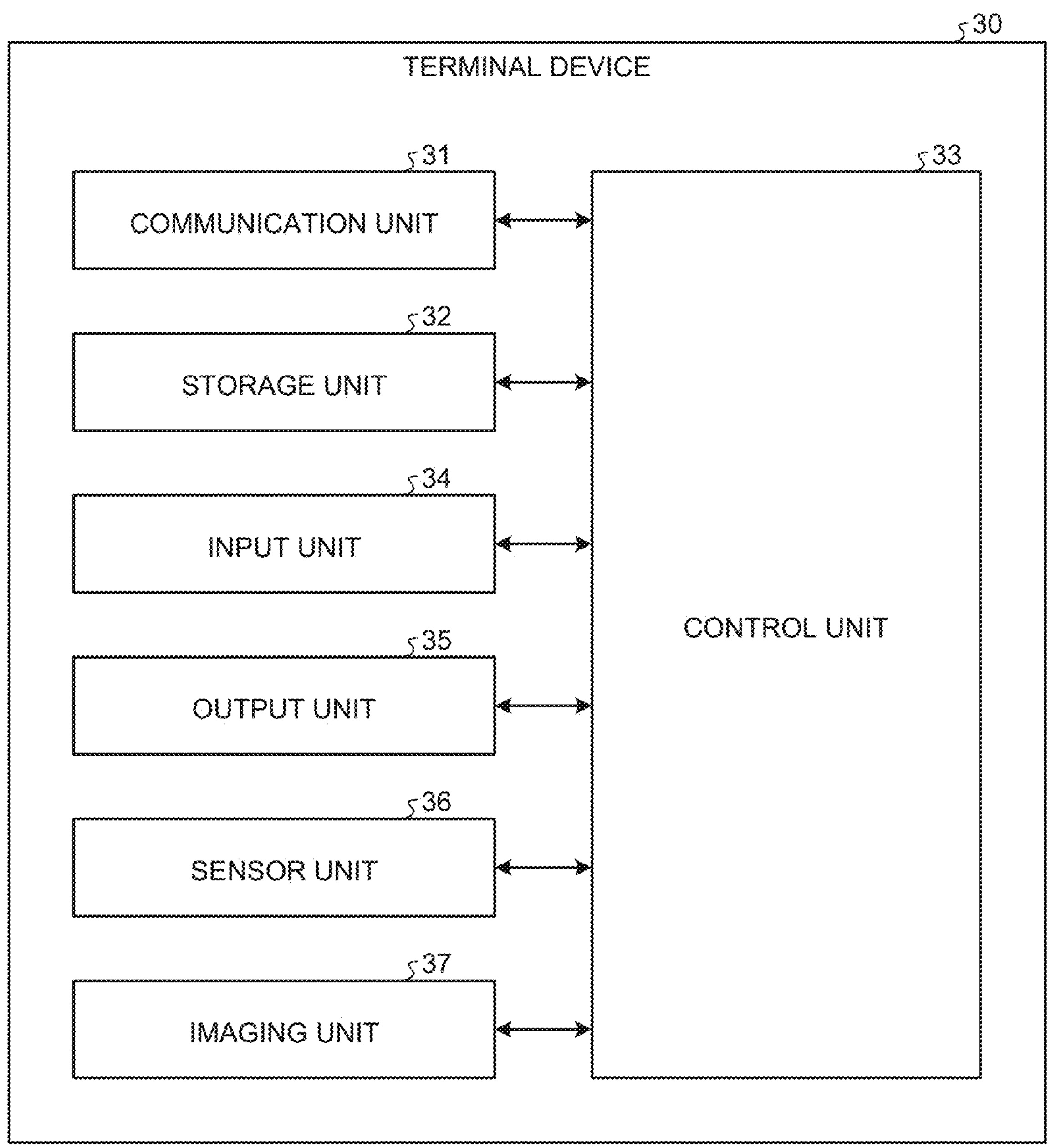
FIG. 6 is a view illustrating a configuration example of a terminal device according to the embodiment of the present disclosure.

FIG. 6 is a view illustrating a configuration example of the terminal device 30 according to the embodiment of the present disclosure. The terminal device 30 includes a communication unit 31, a storage unit 32, a control unit 33, an input unit 34, an output unit 35, a sensor unit 36, and an imaging unit 37. Note that the configuration illustrated in FIG. 6 is a functional configuration, and a hardware configuration may be different therefrom. Furthermore, functions of the terminal device 30 may be implemented in a manner of being distributed in a plurality of physically-separated configurations.

The communication unit 31 is a communication interface for communicating with other devices. For example, the communication unit 31 is a LAN interface such as an NIC. Note that the communication unit 31 may be a wired interface or a wireless interface. In a case where the communication unit 31 includes the wireless interface, the communication unit 31 may be configured to be connected to the network N or another communication device by utilization of a radio access technology (RAT) such as long term evolution (LTE), new radio (NR), Wi-Fi, or Bluetooth (registered trademark). The communication unit 31 communicates with the distribution server 10, the imaging device 20, and the like under the control of the control unit 33.

The storage unit 32 is a data readable/writable storage device such as a DRAM, an SRAM, a flash memory, or a hard disk. The storage unit 32 functions as a storage unit of the terminal device 30.

The control unit 33 is a controller that controls each unit of the terminal device 30. The control unit 33 is realized by, for example, a processor such as a CPU, an MPU, or a GPU. For example, the control unit 33 is realized by the processor executing various programs, which are stored in the storage device inside the terminal device 30, by using a RAM or the like as a work area. Note that the control unit 33 may be realized by an integrated circuit such as an ASIC or FPGA. Any of the CPU, the MPU, the GPU, the ASIC, and the FPGA can be regarded as a controller.

The input unit 34 is an input device that receives various inputs from the outside. For example, the input unit 34 is an operation device for the user to perform various operations, such as a keyboard, a mouse, or operation keys. Note that in a case where a touch panel is employed as the terminal device 30, the touch panel is also included in the input unit 34. In this case, the user performs various operations by touching a screen with a finger or a stylus.

The output unit 35 is a device that performs various outputs such as sound, light, vibration, and an image to the outside. The output unit 35 includes a display device that displays various kinds of information. The display device is, for example, a liquid crystal display or an organic electro luminescence (EL) display. Note that in a case where a touch panel is employed as the terminal device 30, the display device may be a device integrated with the input unit 34. Furthermore, in a case where the terminal device 30 is the xR device (such as AR/MR glasses), the output unit 35 may be a transmission-type device that projects an image on the glasses, or may be a retina projection-type device that directly projects an image on a retina of the user. The output unit 35 performs various outputs to the user under the control of the control unit 33.

The sensor unit 36 is a sensor that acquires information related to a position or posture of the terminal device 30. For example, the sensor unit 36 is an acceleration sensor. Note that the sensor unit 36 is not limited to the acceleration sensor. The sensor unit 36 may be an inertial measurement unit (IMU), a geomagnetic sensor, or a 3D sensor. Furthermore, the sensor unit 36 may be a global navigation satellite system (GNSS) sensor. The GNSS sensor may be a global positioning system (GPS) sensor, a GLONASS sensor, a Galileo sensor, or a quasi-zenith satellite system (QZSS) sensor. Furthermore, the sensor unit 36 may be a combination of these plurality of sensors. The sensor unit may be configured to be able to detect a motion (such as a handclap or the like) of the user.

The imaging unit 37 is a conversion unit that converts an optical image into an electric signal. The imaging unit 37 includes, for example, an image sensor, a signal processing circuit that processes an analog pixel signal output from the image sensor, and the like, and converts light entering from a lens into digital data (image data). Note that an image captured by the imaging unit 37 is not limited to a video (moving image), and may be a still image. Note that the imaging unit 37 can be rephrased as a camera.

3. OPERATION OF THE INFORMATION PROCESSING SYSTEM

The configuration of the information processing system 1 has been described above. Next, the operation of the information processing system 1 will be described.

<3-1. Outline of an Operation of the Distribution Server>

Figure 7:
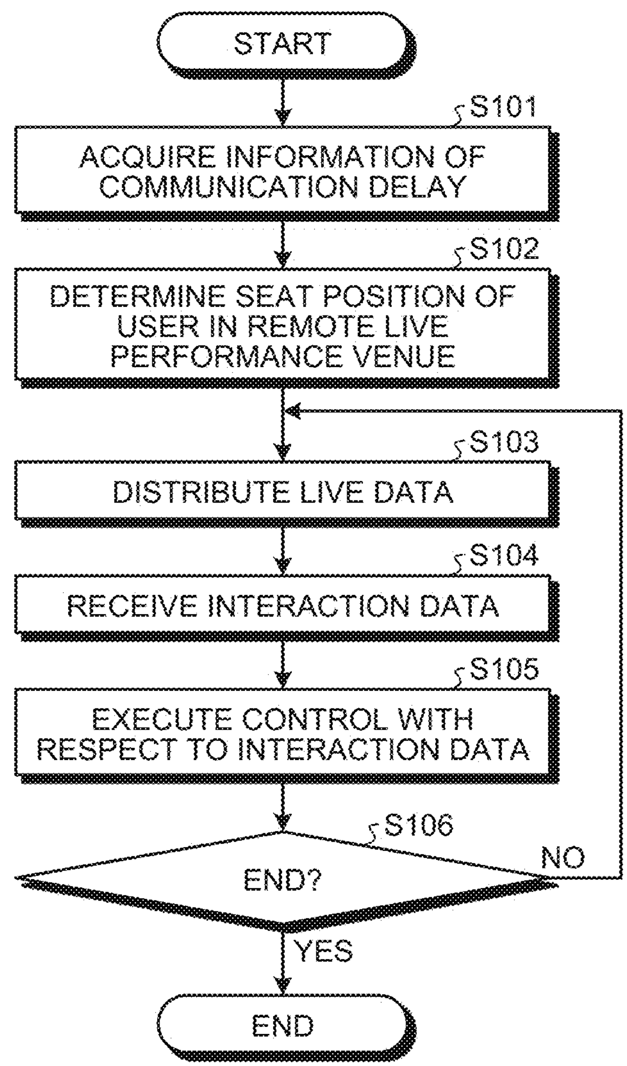
FIG. 7 is a flowchart illustrating distribution processing of a remote live performance.

First, an outline of the operation of the distribution server 10 will be described. FIG. 7 is a flowchart illustrating distribution processing of a remote live performance. The distribution processing is processing of enabling participation in the performance of the artist from a remote place. In the following, the outline of the operation of the distribution server 10 will be described with reference to FIG. 7. The following processing is executed by the control unit 13 of the distribution server 10.

First, the acquisition unit 131 of the distribution server 10 acquires information of a communication delay (Step S101). For example, the acquisition unit 131 acquires information of a delay between the distribution server 10 and the terminal device 30 or a delay between the terminal device 30 and another terminal device 30. At this time, the acquisition unit 131 may acquire the information of the delay measured by the terminal device 30 from the terminal device 30, or may measure the delay by itself.

Then, the data control unit 132 of the distribution server 10 determines a seat position of the user in a remote live performance venue on the basis of the information of the communication delay which information is acquired in Step S101 (Step S102). The remote live performance venue is a virtual space imitating a real live performance venue. By viewing the remote live performance venue through the terminal device 30 (such as a VR device), the user can have an experience as if he/she is in the real live performance venue. In the remote live performance venue, seats are prepared similarly to the real live performance venue. The data control unit 132 determines the seat of the user who uses the terminal device 30 on the basis of the information of the delay which information is acquired in Step S101.

Then, the acquisition unit 131 of the distribution server 10 receives video data of the performance of the artist from the imaging device 20. Then, the data control unit 132 of the distribution server 10 distributes the video data to the terminal device 30 as live data (Step S103).

Then, the distribution server 10 receives interaction data of the terminal device 30 (such as data of a cheer or handclap from the user of the terminal device 30) with respect to the live data (Step S104). The interaction data is, for example, data of the cheer or motion (such as handclap) of the user wearing the terminal device 30.

Then, the data control unit 132 of the distribution server 10 executes control on the interaction data (Step S105). For example, it is assumed that the interaction data is cheer data of the user. At this time, the data control unit 132 may adjust volume of the interaction data distributed to the terminal device 30 of the artist on the basis of the information of the communication delay which information is acquired in Step S101. More specifically, the data control unit 132 may increase the volume as the delay is lower, and decrease the volume as the delay is longer.

Then, the distribution server 10 determines whether the performance of the artist is over (Step S106). In a case where the performance is not over (Step S106: No), the distribution server 10 returns the processing to Step S103. In a case where the performance is over (Step S106: Yes), the distribution server 10 ends the distribution processing.

Note that the operation example of the distribution server 10 is not limited to the flowchart illustrated in FIG. 7. For example, Step S102 may not be an essential component in the operation of the distribution server 10. For example, the distribution server 10 may use the information of the communication delay which information is acquired in Step S101 for the control on the interaction data in Step S105 without performing the operation in Step S102.

Although the outline of the operation of the distribution server 10 has been described above, the operation of the distribution server 10 will be described in detail in the following.

<3-2. Acquisition of the Information of the Communication Delay>

First, the acquisition of the information of the communication delay in Step S101 will be described in detail.

<3-2-1. Communication Delay>

In the present embodiment, the communication link that measures the communication delay is divided into a communication link A and a communication link B as illustrated in FIG. 1. The communication link A is a communication link between the distribution server 10 that distributes the live data of the artist and the terminal device 30 of the user who views the live performance, and the communication link B is a communication link between the users who view the live performance. Note that the communication link A may be regarded as a link between the terminal device 30 or the imaging device 20 of the artist and the terminal device 30 of the user. The artist is interchangeable with an organizer of the live performance.

Since varying depending on the communication link (that is, depending on the terminal device 30 of the fan and/or the distribution server 10), the communication delay is individually measured. There are a case where the measurement is performed on a side of the distribution server 10 and a case where the measurement is performed on a side of the terminal device 30. For example, in a case where the measurement is performed on the side of the distribution server 10, the distribution server 10 can acquire a measurement result of the communication delay in the communication link A for each terminal device 30. On the other hand, in a case where the measurement is performed on the side of the terminal device 30, the distribution server 10 can acquire a measurement result of the communication delay in the communication link B in addition to the measurement result of the communication delay in the communication link A. Note that the communication delay in the communication link A is also referred to as a first delay, and the communication delay in the communication link B is also referred to as a second delay.

In addition, the communication delay also varies depending on a communication layer (such as a physical layer, a media access control (MAC) layer, an application layer, or the like). In the present embodiment, a communication delay in any communication layer can be assumed.

Furthermore, the communication node to measure the communication delay (that is, the distribution server 10, the terminal device 30, or the like) may be an individual communication node as described above. Furthermore, a communication node group in which a plurality of communication nodes is grouped may be set as one communication node. That is, the communication delay may be measured with a distribution server 10 group in which a plurality of the distribution servers 10 is grouped being one communication node, or with a terminal device 30 group in which a plurality of the terminal devices 30 is grouped being one communication node. Note that grouping of the terminal devices 30 will be described later.

Furthermore, in the present embodiment, various delays such as a delay on a network at a gateway of the terminal device 30 or the distribution server 10, and a delay including a processing delay of the terminal device 30 or the distribution server 10 can be assumed as the communication delay.

Furthermore, the communication delay may be an instantaneous communication delay (such as a communication delay measured each time of data transmission or each time of control). Furthermore, the communication delay may be a communication delay averaged at predetermined time intervals. Furthermore, the communication delay may be a communication delay acquired by a moving average using a predetermined forgetting coefficient. In addition, various parameters related to a delay, such as delay variance may be used to calculate the communication delay.

In addition, a congestion state of an edge network (apartment type and in a wireless manner) or a metro network (local network) of each terminal device 30 may be taken into consideration in the measurement of the communication delay.

<3-2-2. Measurement Method of the Communication Delay>

Various methods can be used to measure the communication delay. Since the communication delay also varies depending on a communication layer, the measurement method may vary depending on a communication layer to be measured.

(1) First Example

A communication layer of a certain communication node generates a predetermined signal (packet and information) for another communication node to measure a communication delay, and transmits the predetermined signal to the other communication node. The other communication node receives the transmitted predetermined signal. When the other communication node can determine transmission timing (time) of the predetermined signal, a communication delay can be grasped from a time difference from reception timing of the predetermined signal. For example, as a determination method of the transmission timing of the predetermined signal, it is conceivable to add a time stamp indicating the transmission time to the predetermined signal.

Figure 8:
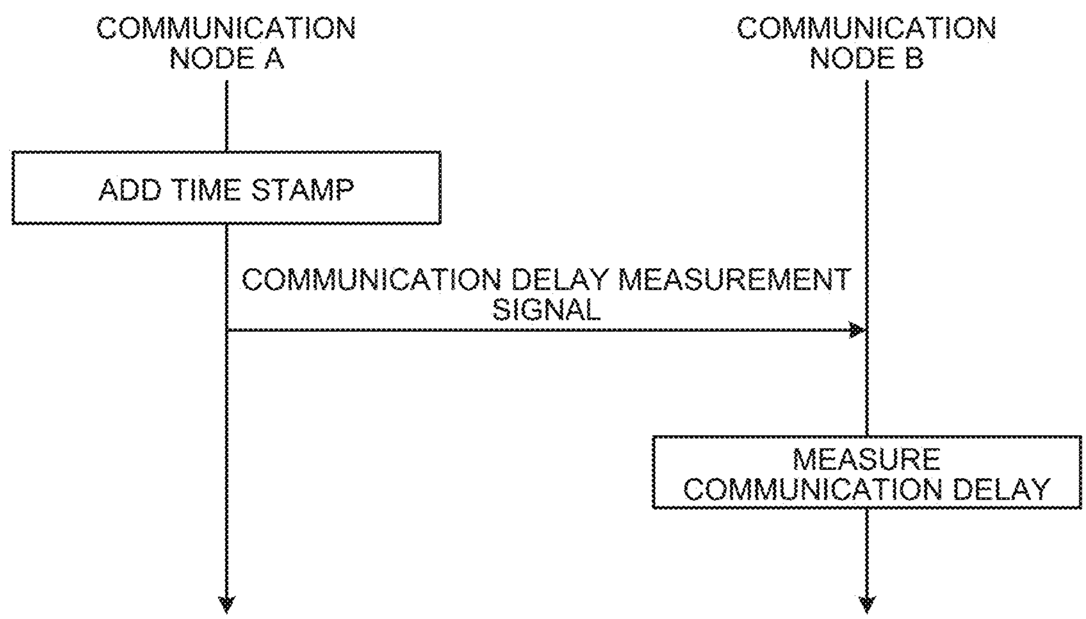
FIG. 8 is a view illustrating an example of a measurement flow of a communication delay.

FIG. 8 is a view illustrating an example of a measurement flow of the communication delay. The communication node A (such as the distribution server 10 or the terminal device 30) adds the time stamp related to the transmission time to a communication delay measurement signal, and transmits the signal to the communication node B. The communication node B (such as the distribution server 10 or the terminal device 30) measures the communication delay on the basis of the time stamp added to the received signal and reception timing of the signal. Furthermore, the communication node B can notify the communication node A of the measured communication delay. Although this communication delay is a delay in a communication link from the communication node A to the communication node B, it can be assumed that a delay in a communication link from the communication node B to the communication node A is also equivalent.

(2) Second Example

A certain communication node transmits a predetermined signal to another communication node. The other communication node B transmits a response signal corresponding to the predetermined signal to the certain communication node. The certain communication node measures a communication delay on the basis of transmission timing of the predetermined signal and reception timing of the response signal. For example, the certain communication node measures the communication delay by using a ping value by a ping command of an IP layer.

Figure 9:
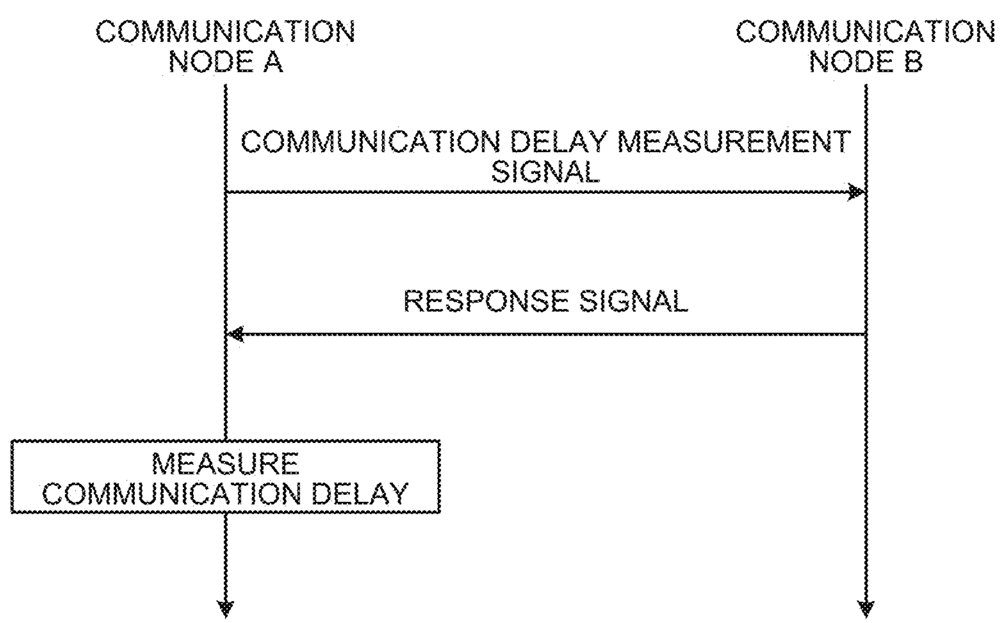
FIG. 9 is a view illustrating another example of the measurement flow of the communication delay.

FIG. 9 is a view illustrating another example of the measurement flow of the communication delay. The communication node A (such as the distribution server 10 or the terminal device 30) transmits a communication delay measurement signal to the communication node B. This communication delay measurement signal can include control information for transmitting the response signal for measuring the communication delay. The communication node B (such as the distribution server 10 or the terminal device 30) transmits the response signal to the communication node A on the basis of the communication delay measurement signal. The communication node A measures the communication delay on the basis of the transmission timing of the communication delay measurement signal and the reception timing of the response signal. This communication delay is a round-trip delay between the communication node A and the communication node B. One of the communication delays can be assumed to be a half of the round-trip delay.

(3) Third Example

The communication delay may not be actually measured. The communication delay may be an estimated (assumed) value. The communication delay may be estimated on the basis of information such as a communication method used in a communication link, a set communication parameter, a communication mode, and a communication format. Specifically, in a certain communication link, a communication delay may be assumed by setting in a plurality of communication modes defined according to a required condition of the communication delay. In the present embodiment, measurement of the communication delay may be read as estimation of the communication delay.

For example, it is assumed that a network to which the user is connected is 5G NR. In a case where the communication node (such as the distribution server 10 or the terminal device 30) estimates the communication delay on the basis of the information of the communication parameter, a 5G QoS Identifier (5QI) value can be used as this communication parameter. FIG. 10 is a view illustrating a part of 5QI. The estimated communication delay can be determined on the basis of a packet delay budget in the table illustrated in FIG. 10. For example, when 5QI value=71 is set for a certain user, the communication node estimates that the communication delay at that time is 150 ms.

<3-3. Control Related to a Remote Live Performance Based on the Communication Delay>

Next, control related to a remote live performance which control is based on a communication delay will be described in detail.

As described above, the distribution server 10 acquires the information of the communication delay in each of the communication links, and performs various kinds of control in the remote live performance on the basis of the acquired information of the communication delay. As the control related to the remote live performance, determination of a seat position of a user in a remote live performance venue (Step S102 in FIG. 7) and control on interaction data (Step S106 in FIG. 7) may be assumed.

<3-3-1. Determination of a Seat in the Remote Live Performance Venue>

First, determination of a seat position of a user (fan) in the remote live performance venue will be described.

In this embodiment, a case where an artist performs a remote live performance at a virtual concert venue is assumed. In the following description, the virtual concert venue may be referred to as a remote live performance venue.

Figure 11:
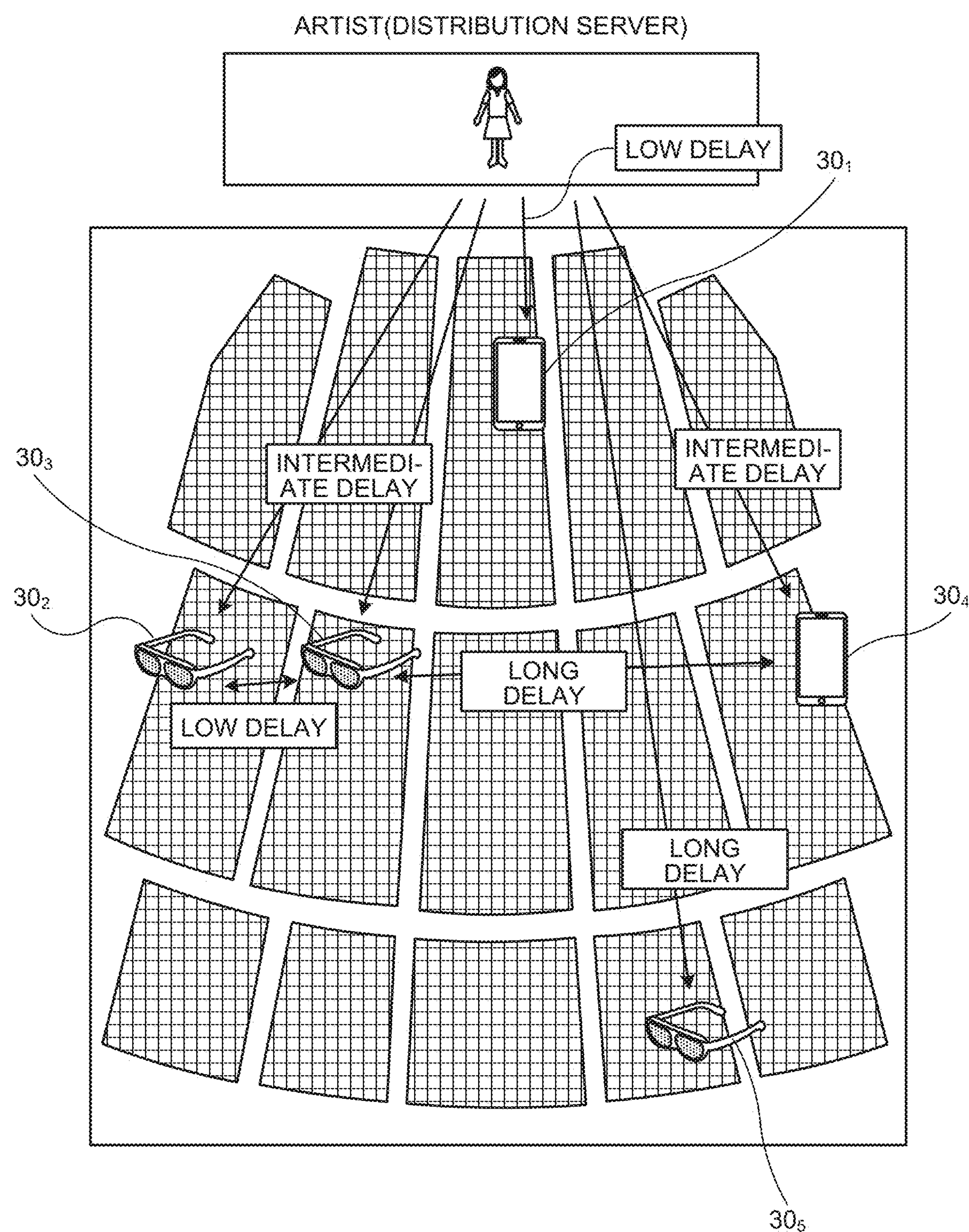
FIG. 11 is a view illustrating an example of a remote live performance venue.

FIG. 11 is a view illustrating an example of the remote live performance venue. The remote live performance venue is a virtual space imitating a real live performance venue. By viewing the remote live performance venue through the terminal device 30 (such as a VR device), the user can have an experience as if he/she is in the real live performance venue.

In the remote live performance venue, seats are prepared similarly to the real live performance venue. As illustrated in FIG. 11, the artist is located on a platform of the concert venue. The distribution server 10 determines a virtual position (seat position) of the terminal device 30 (user to be an audience) in the remote live performance venue on the basis of information related to a communication delay of the terminal device 30. At this time, a communication delay of the communication link A corresponds to a distance to the artist, and a communication delay of the communication link B corresponds to a distance between users. In other words, the distribution server 10 determines the distance of each user from the artist in the virtual space on the basis of the communication delay of the communication link A. Furthermore, the distribution server 10 determines a distance between each user and another user in the virtual space on the basis of the communication delay of the communication link B.

In the example of FIG. 11, five users participate in the remote live performance. Each of the users accesses the virtual space (remote live performance venue) via the terminal device 30. The distribution server 10 determines seat positions according to the communication delay. A virtual seat position of each of the users is as follows. Note that in the following example, the distribution server 10 may determine whether the delay in the communication link is a low delay, an intermediate delay, or a long delay on the basis of a predetermined threshold.

(Distance to the Artist)

The distribution server 10 increases the distance between each of the users and the artist in the virtual space as the communication delay increases. For example, the distribution server 10 determines the seat positions of the users as follows.

(1) Since a communication delay in the communication link A between the distribution server 10 and a terminal device $\mathbf{30}_1$ is the low delay, the distribution server 10 sets the seat position of the user of the terminal device $\mathbf{30}_1$ to a position on a front side of the remote live performance venue which position is close to the artist.

(2) Since the communication delay in the communication link A between the distribution server 10 and the terminal devices $\mathbf{30}_2$, $\mathbf{30}_3$, and $\mathbf{30}_4$ is the intermediate delay, the distribution server 10 sets the seat position of each of the users of the terminal devices $\mathbf{30}_2$, $\mathbf{30}_3$, and $\mathbf{30}_4$ to a position in the middle of the remote live performance venue.

(3) Since the communication delay in the communication link A between the distribution server 10 and the terminal device $\mathbf{30}_5$ is the long delay, the distribution server 10 sets the seat position of the user of the terminal device $\mathbf{30}_5$ to a position on a back side of the remote live performance venue which position is far from the artist.

(Distance Between the Users)

The distribution server 10 increases the distance between the users in the virtual space as the communication delay increases. For example, the distribution server 10 determines the seat positions of the users as follows.

(1) Since the communication delay in the communication link B between the user of the terminal device $\mathbf{30}_2$ and the user of the terminal device $\mathbf{30}_3$ is the low delay, the distribution server 10 arranges the user of the terminal device $\mathbf{30}_2$ and the user of the terminal device $\mathbf{30}_3$ at seats relatively close to each other.

(2) Since the communication delay in the communication link B between the user of the terminal device $\mathbf{30}_3$ and the user of the terminal device $\mathbf{30}_4$ is the long delay, the distribution server 10 arranges the user of the terminal device $\mathbf{30}_3$ and the user of the terminal device $\mathbf{30}_4$ at seats relatively far from each other.

The distribution server 10 performs control related to interaction data on the basis of the determined positions. For example, the distribution server 10 transmits data of a cheer of a user, which data is to be transmitted to the terminal device 30 of another user or the terminal device 30 of the artist, at timing corresponding to the seat position of the user.

Here, since a propagation speed of sound is lower than a communication speed, the sound itself is delayed depending on a seat of an audience in an actual large concert venue. Specifically, a sound delay of about 300 ms is generated at a distance of 100 m, and a sound delay of about 30 ms is generated even at a distance of 10 m. When the seat arrangement in the above manner is performed on the basis of the communication delay, interaction data from each user to the artist and/or another user is received with the communication delay similar to the sound delay due to the virtual distance. Thus, even in a case where the communication delay varies depending on the user, sense of presence similar to that in the actual live performance can be experienced in the remote live performance.

Note that although the method of determining the virtual seat positions according to the communication delays has been described in the above description, the distribution server 10 may acquire, from a user, a virtual seat position selected by the user from a seat range which is determined on the basis of the communication delay and in which selection can be made by the user. Then, the distribution server 10 may perform control related to the interaction data on the basis of information of the acquired seat position.

Here, the seat range in which the user can make selection is determined as follows, for example. For example, in the example of FIG. 11, the distribution server 10 increases the selectable seat range as the communication delay of the communication link A is lower, for example, as illustrated in (1) to (3) in the following. Note that the distribution server 10 may change a live performance fee according to the distance to the artist within the selectable seat range, similarly to a normal concert.

(1) Since the communication delay in the communication link A between the distribution server 10 and the terminal device $\mathbf{30}_1$ is the low delay, the distribution server 10 expands the seat range of the user of the terminal device $\mathbf{30}_1$ not only to a range close to the artist but also to a range behind the range (that is, far from the artist)

(2) Since the communication delay in the communication link A between the distribution server 10 and the terminal devices $\mathbf{30}_2$, $\mathbf{30}_3$, and $\mathbf{30}_4$ is the intermediate delay, the distribution server 10 expands the seat range of the user of each of the terminal devices $\mathbf{30}_2$, $\mathbf{30}_3$, and $\mathbf{30}_4$ not only to a range in the middle of the remote live performance venue but also to a range behind the range (that is, far from the artist).

(3) Since the communication delay in the communication link A between the distribution server 10 and the terminal device $\mathbf{30}_5$ is the long delay, the distribution server 10 sets the seat range of the user of the terminal device $\mathbf{30}_1$ only to a range far from the artist.

Note that although a case where the remote live performance venue is assumed has been described in the above description, this is not a limitation. The method of the present invention can be used simply to determine a relative positional relationship (such as a distance) between the artist and the fans and/or a relative positional relationship between the fans in the virtual space.

<3-3-2. Control on the Interaction Data>

Next, the control on the interaction data will be described.

The distribution server 10 performs the control related to the interaction data from the terminal device 30 on the basis of the information on the communication delay. Here, the interaction data is information related to a voice or a motion (such as a handclap) of the user of the terminal device 30. In the present embodiment, the control related to the interaction data includes a volume adjustment, a delay amount adjustment, and/or filtering. Note that in the present embodiment, in a case where the distribution server 10 uses distance information when performing the control related to the interaction data, the distance may be a virtual distance calculated on the basis of the communication delay.

Note that in the following description, although a case where the interaction data from the user is transmitted to the artist will be described, the following control example can be similarly applied to a case where the interaction data is shared between the users. Note that although it is assumed in the following control example that the distribution server 10 performs processing, a device that performs the following processing is not limited to the distribution server 10, and may be the terminal device 30. Furthermore, the following processing may be performed on either on a transmission side or a reception side.

In a case where the processing is performed by the terminal device 30, the distribution server 10 can transmit information necessary for performing the processing to the terminal device 30. For example, the information may include information indicating the first delay, information indicating the second delay, information indicating timing (time) of generation or transmission of distribution data and/or the interaction data, and the like. The terminal device 30 controls the distribution data and/or the interaction data on the basis of these pieces of information.

(1) Adjustment of Volume

For example, it is assumed that the interaction data is data of a cheer from the user of the terminal device 30. In a case where the data of the cheer from the user is transmitted to the artist, the distribution server 10 adjusts volume of the cheer on the basis of the communication delay of the communication link A of the user. In the adjustment of the volume, equations of distance attenuation of sound in the following equations (1) and (2) can be used.

$$\text{Attenuation amount}=20*\log_{10}(r2/r1) \quad (1)$$

$$\text{Attenuation amount}=10*\log_{10}(r2/r1) \quad (2)$$

Here, the equation (1) is an equation indicating an attenuation amount at a point sound source, and the equation (2) is an equation indicating an attenuation amount at a linear sound source. The point sound source is a sound source regarded as a point such as a tapping sound, and the linear sound source is a sound source having a long linear shape such as machines arranged in line, a traffic noise of a road, or the like. Here, r1 is a distance from a sound generation source at a point where a noise level (dB) is measured (such as a position of the user in the virtual space), and r2 is a distance to a place where the sound is heard (that is, the artist in this example). Here, a unit of the distance is, for example, meters.

Note that in a case where classification into the point sound source and the linear sound source cannot be performed, the attenuation amount may be calculated by utilization of both the equations (1) and (2). For example, the distribution server 10 may use, as the attenuation amount, an intermediate value of the values calculated by the equations (1) and (2).

Note that in a case where a predetermined communication delay is exceeded in the adjustment of the volume, the distribution server 10 can set the volume to 0. In this case, since interaction data with a long communication delay can be cut, sense of presence can be realized without discomfort on a side of the artist.

(2) Adjustment of a Delay Amount

For example, it is assumed that the interaction data is data of a cheer from the user of the terminal device 30. In a case where the data of the cheer from the user is transmitted to the artist, the distribution server 10 adjusts a delay amount of the cheer on the basis of the communication delay in the communication link A of the user. More specifically, the distribution server 10 further adds a delay to the actual communication delay. For example, in a case where a plurality of the users (terminal devices 30) is grouped, a delay is added to transmission of the interaction of each of the users in such a manner that the delays become the same between the users in the group.

(3) Filtering

For example, it is assumed that the interaction data is data of a cheer from the user of the terminal device 30. In a case where the data of the cheer from the user is transmitted to the artist, the distribution server 10 performs filtering on the basis of the communication delay in the communication link A of the user. For this filtering, various filters such as a sound source separation filter and a filter utilizing artificial intelligence can be used. For example, the distribution server 10 performs filtering processing of cutting only a spoken voice and extracting only the cheer on the interaction data in which the communication delay is lower than a predetermined threshold and the volume is larger than predetermined volume. As a result, it is possible to deliver the interaction data in consideration of privacy to the artist.

Note that the control on the interaction data is not limited to the above. For example, the control on the interaction data may be adapted to spatial audio (stereophonic sound). The spatial audio means an experience in which the user can enjoy a stereoscopic sound through a speaker or a headphone by arrangement of each sound source as an object at an arbitrary position in a virtual sound field space extending over an entire celestial sphere. For example, the interaction data from the user may be arranged at different positions on the sound field space according to delay time of the user. For example, in a case where interaction data from a user is transmitted to the artist and a speaker that performs an output for the artist is compatible with the spatial audio, interaction data (sound source) from a user with a low communication delay may be arranged as an object at a position close to the user in the sound field space. Similarly, interaction data (sound source) from a user with a long communication delay may be arranged as an object at a position far from the user in the sound field space. For example, even in a case where interaction data from a user is transmitted to another user, processing may be performed in a similar manner.

<3-4. Grouping>

The distribution server 10 may group the plurality of terminal devices 30. Then, the distribution server 10 may perform control related to the interaction data for each group. Note that the distribution server 10 can group the plurality of terminal devices 30 by using various methods. In the following, a method of grouping the plurality of terminal devices 30 will be described. Note that the distribution server 10 can use the grouping method described in the following alone or can combine a plurality of grouping methods. The processing described in the following is executed by the grouping unit 133 of the distribution server 10, for example.

<3-4-1. Grouping Performed Based on the Communication Delay>

The distribution server 10 may group the plurality of terminal devices 30 on the basis of the information of the communication delay of each of the plurality of terminal devices 30. For example, the distribution server 10 groups the plurality of terminal devices 30 on the basis of the information of the communication delay in the communication link A and/or the communication delay in the communication link B of each of the plurality of terminal devices 30. FIG. 12 is a view illustrating a correspondence relationship between groups and communication delays. Here, t is a communication delay, and T0 to T3 are reference values (threshold) for grouping. As illustrated in FIG. 12, the distribution server 10 holds in advance a list of groups for each predetermined range with respect to the communication delay, and groups the plurality of terminal devices 30 on the basis of the communication delay of each of the users and the list.

The live data may include video data. Then, the distribution server 10 may group the plurality of terminal devices 30 by applying information of the communication delay of each of the plurality of terminal devices 30 to the reference value in units of the number of frames (frame rate) of the video. For example, T0 to T3 illustrated in FIG. 12 may be reference values in units of the number of frames of the video. For example, the distribution server 10 groups the plurality of terminal devices 30 by using the reference value in units of the number of frames of the video, such as every 33 ms or every 16 ms. As a result, the plurality of terminal devices 30 having the same uplink and downlink delays in terms of the number of frames can be grouped into the same group.

The communication delay in the communication link B that is a communication link between the terminal devices 30 may not be measured in all the terminal devices 30. For example, the distribution server 10 randomly performs P2P connection of a plurality of the terminal devices 30 grouped at a certain virtual position, and measures mutual delays. At this time, the distribution server 10 may establish the P2P connection with a several devices with the measured mutual delays being short, and sets a group in which excitement data is exchanged with each other.

<3-4-2. Grouping Performed Fixedly>

The distribution server 10 may fixedly perform grouping according to a predetermined condition or parameter.

(1) Grouping Based on Information of a Connected Network Operator

The distribution server 10 may group the plurality of terminal devices 30 on the basis of the information of the connected network operator of each of the plurality of terminal devices 30. The information of the connected network operator is, for example, information of a line provider or an Internet provider to which the user and/or the artist is connected. The information of the connected network operator may be information of a network operator to which the user and/or the artist subscribes (or of a used SIM card).

Note that network operators in a radio line may include a mobile network operator (MNO), a mobile virtual network operator (MVNO), and a mobile virtual network enabler (MVNE).

Furthermore, the distribution server 10 may switch the control according to whether the network operator to which the terminal device 30 of the user is connected is a predetermined network operator designated by the side of the artist. For example, in a case where the network operator to which the terminal device 30 is connected is the predetermined network operator designated by the side of the artist, the distribution server 10 controls transmission of data in such a manner that the communication delay becomes as low as possible.

(2) Grouping Based on Information of the Communication System

The distribution server 10 may group the plurality of terminal devices 30 on the basis of information of the communication system (communication form and communication method) used for communication by the terminal devices 30 of the user and/or the artist. Here, in a case of a wired line, the information of the communication system may include information for determining an optical fiber, an ADSL, a cable television line, a coaxial cable line, or the like. Furthermore, in a case of a radio line, information for determining 4G LIE, 5G NR, a wireless LAN, satellite communication, device-to-device (D2D) communication, or the like may be included.

(3) Grouping Based on Designation

The distribution server 10 may group the plurality of terminal devices 30 on the basis of designation by a user of a predetermined terminal device 30. For example, the distribution server 10 sets a plurality of users designated in advance by a predetermined user and/or the artist as the same group.

For example, it is assumed that a predetermined user previously designates a friend or an acquaintance as the same group. At this time, the distribution server 10 groups the plurality of terminal devices 30 on the basis of information of the designation. For example, in a case where the users share interaction data, the distribution server 10 restricts transmission of the interaction data to the terminal devices 30 in this group. Furthermore, for example, the distribution server 10 may control the transmission of the interaction data in such a manner that the interaction data (voice data) including a spoken voice is shared only in this group and the interaction data (voice data) such as a cheer other than the spoken voice is shared with other groups.

Furthermore, the distribution server 10 may be configured in such a manner that the artist (organizer) can designate users who pay a large fee (tip) as the same group in advance. At this time, the distribution server 10 groups the plurality of terminal devices 30 on the basis of information of the designation. Note that this group may be preferentially treated in the above control.

(4) Grouping Based on Real Position Information

The distribution server 10 may group the plurality of terminal devices 30 on the basis of real position information of each of the plurality of terminal devices 30. The distribution server 10 groups the plurality of terminal devices 30 on the basis of actual position information of the remotely participating user and/or artist. At this time, a unit of positions to be grouped may be an administrative district such as a country, a region, a prefecture, or a municipality, or may be a cell (communication area covered by a base station) in a cellular network.

(5) Grouping Based on an Access Log

The distribution server 10 may perform grouping on the basis of an access log of the terminal device 30 (user). For example, the distribution server 10 uses whois for an IP address included in the access log of the user and acquires country and netname. The distribution server 10 performs grouping according to country information and/or a type of an Internet service provider (ISP) acquired on the basis of these pieces of information.

As a result, a congestion state on a side of a core of a gateway accommodated by the Internet service provider (ISP) becomes similar in each group. Furthermore, it becomes also possible to classify whether the ISP is a fiber to the home (FTTH) ISP or a mobile ISP. In addition, since characteristics of network address translation (NAT) and a security policy of each ISP are unified for each group, availability of peer to peer (P2P) connection in an application layer is the same in each group. That is, it becomes easy to determine the same protocol for each group.

4. MODIFICATION EXAMPLE

The control device that controls the distribution server 10, the imaging device 20, or the terminal device 30 of the present embodiment may be realized by a dedicated computer system or a general-purpose computer system.

For example, a communication program to execute the above-described operation is stored in a computer-readable recording medium such as an optical disk, a semiconductor memory, a magnetic tape, or a flexible disk and distributed. Then, for example, the program is installed in a computer and the above-described processing is executed, whereby the control device is configured. At this time, the control device may be a device (such as a personal computer) outside the distribution server 10, the imaging device 20, or the terminal device 30. Furthermore, the control device may be a device (such as the control unit 13, the control unit 23, or the control unit 33) inside the distribution server 10, the imaging device 20, or the terminal device 30.

Furthermore, the communication program may be stored in a disk device included in a server device on a network such as the Internet in such a manner as to be downloadable to a computer. In addition, the above-described functions may be realized by cooperation of an operating system (OS) and application software. In this case, a portion other than the OS may be stored in a medium and distributed, or the portion other than the OS may be stored in a server device and downloaded to a computer.

Furthermore, among the pieces of processing described in the above embodiment, a whole or part of the processing described to be automatically performed can be manually performed, or a whole or part of the processing described to be manually performed can be automatically performed by a known method. In addition, the processing procedures, specific names, and information including various kinds of data or parameters illustrated in the above document or in the drawings can be arbitrarily changed unless otherwise specified. For example, various kinds of information illustrated in each of the drawings are not limited to the illustrated information.

In addition, each component of each of the illustrated devices is a functional concept, and does not need to be physically configured in the illustrated manner. That is, a specific form of distribution/integration of each device is not limited to what is illustrated in the drawings, and a whole or part thereof can be functionally or physically distributed/integrated in an arbitrary unit according to various loads and usage conditions.

In addition, the above-described embodiments can be arbitrarily combined in a region in which the processing contents do not contradict each other. Furthermore, order of steps illustrated in the flowchart of the above-described embodiment can be changed as appropriate.

Furthermore, for example, the present embodiment can be implemented as any configuration included in a device or a system, such as a processor as system large scale integration (LSI) or the like, a module that uses a plurality of processors or the like, a unit that uses a plurality of modules or the like, a set acquired by further addition of other functions to the unit, or the like (that is, a configuration of a part of the device).

Note that a system means a set of a plurality of components (such as devices and modules (parts)) and it does not matter whether all the components are in the same housing in the present embodiment. Thus, a plurality of devices housed in separate housings and connected via a network, and one device in which a plurality of modules is housed in one housing are both systems.

Furthermore, for example, the present embodiment can adopt a configuration of cloud computing in which one function is shared and processed by a plurality of devices in cooperation via a network.

Furthermore, the interaction data in some of the embodiments described above is not limited to voice data. For example, the interaction data may be video data, tactile data, olfactory data, or taste data.

5. CONCLUSION

As described above, the distribution server 10 performs the control related to the interaction data from the terminal device 30 with respect to the live data on the basis of the information of the communication delay between the distribution server 10 and the terminal device 30. For example, the distribution server 10 determines the position of the terminal device 30 in the virtual space shown in the terminal device 30 on the basis of the information on the communication delay, and performs the control related to the interaction data on the basis of the determined position. As a result, the artist and the user can experience immersive feeling such as that in a live performance even in the remote live performance.

Although embodiments of the present disclosure have been described above, a technical scope of the present disclosure is not limited to the above-described embodiments as they are, and various modifications can be made within the spirit and scope of the present disclosure. In addition, components of different embodiments and modification examples may be arbitrarily combined. For example, some or all of the above-described embodiments and some or all of other embodiments may be combined and performed.

Furthermore, an effect in each of the embodiments described in the present specification is merely an example and is not a limitation, and there may be another effect.

Note that the present technology can also have the following configurations.

(1)

An information processing device that distributes live data to a first terminal device, the information processing device comprising:

an acquisition unit that acquires information of a delay between the first terminal device that transmits interaction data with respect to the live data and the information processing device, or a delay between a second terminal device, which receives the interaction data from the first terminal device with respect to the live data, and the first terminal device; and a data control unit that performs control related to the interaction data from the first terminal device on a basis of the acquired information of the delay.

(2)

The information processing device according to (1), wherein the data control unit determines a position of the first terminal device in a virtual space shown in the first terminal device on a basis of the acquired information of the delay, and performs control related to the interaction data on a basis of the determined position.

(3)

The information processing device according to (1), further comprising an acquisition unit that acquires, from a range in the virtual space shown in the first terminal device which range is determined on a basis of the delay, information of a position of the first terminal device which position is selected by a user of the first terminal device, wherein the data control unit performs the control related to the interaction data on a basis of the acquired information of the position.

(4)

The information processing device according to any one of (1) to (3), wherein the interaction data is information related to a voice or a motion of a user of the first terminal device.

(5)

The information processing device according to any one of (1) to (4), wherein the interaction data is a voice of a user of the first terminal device, and the data control unit performs control related to volume of the voice of the user of the first terminal device on a basis of the acquired information of the delay.

(6)

The information processing device according to any one of (1) to (4), wherein a plurality of the first terminal devices is present, the acquisition unit acquires a plurality of pieces of the information of the delay, and the data control unit performs control of magnitude of a transmission delay of the interaction data from the first terminal device to the second terminal device on a basis of the acquired plurality of pieces of information of the delay.

(7)

The information processing device according to (6), wherein the data control unit adds a delay amount determined on a basis of the acquired plurality of pieces of information of the delay to transmission of the interaction data.

(8)

The information processing device according to any one of (1) to (4), wherein the data control unit performs filtering processing on the interaction data on a basis of the acquired delay.

(9)

The information processing device according to (8), wherein the interaction data is a voice of a user of the first terminal device, and the data control unit performs the filtering processing related to the voice with respect to the interaction data on a basis of the acquired delay.

(10)

The information processing device according to (9), wherein in a case where the acquired delay is lower than a predetermined threshold and volume of the voice is larger than predetermined volume, the data control unit performs filtering processing of cutting a spoken voice.

(11)

The information processing device according to any one of (1) to (10), further comprising a grouping unit that groups a plurality of the first terminal devices, wherein the data control unit performs the control related to the interaction data for each of the groups.

(12)

The information processing device according to (11), wherein the grouping unit groups the plurality of first terminal devices on a basis of the information of the delay of each of the plurality of first terminal devices.

(13)

The information processing device according to (12), wherein the live data includes at least video data, the grouping unit groups the plurality of first terminal devices by applying the information of the delay to one or a plurality of reference values for grouping of the plurality of first terminal devices, and the one or plurality of reference values is a value in a unit of a number of frames of a video.

(14)

The information processing device according to (11), wherein grouping of the plurality of first terminal devices is performed on a basis of information of a connected network operator of each of the plurality of first terminal devices.

(15)

The information processing device according to (11), wherein grouping of the plurality of first terminal devices is performed on a basis of designation by a user of a predetermined one of the first terminal devices or the second terminal device.

(16)

The information processing device according to (11), wherein grouping of the plurality of first terminal devices is performed on a basis of real position information of each of the plurality of first terminal devices.

(17)

An information processing method executed by an information processing device that distributes live data to a first terminal device, the information processing method comprising:

acquiring information of a delay between the first terminal device that transmits interaction data with respect to the live data and the information processing device, or a delay between a second terminal device, which receives the interaction data from the first terminal device with respect to the live data, and the first terminal device; and performing control related to the interaction data from the first terminal device on a basis of the acquired information of the delay.

(18)

An information processing system comprising: a distribution server that distributes live data; one or a plurality of first terminal devices that receives the live data and transmits interaction data with respect to the live data; and a second terminal device that receives the interaction data from the first terminal device with respect to the live data, the information processing system further comprising:

an acquisition unit that acquires information of a delay between the distribution server and the first terminal device or a delay between the second terminal device and the first terminal device; and a data control unit that performs control related to the interaction data from the first terminal device on a basis of the acquired information of the delay.

(19)

The information processing system according to (18), wherein the live data is video data of a performance of an artist, the first terminal device is a terminal device of a user viewing the performance of the artist, and the second terminal device is a terminal device to output, to the artist, the interaction data from the first terminal device that is the terminal device of the user viewing the performance of the artist.

(20)

The information processing system according to (18), wherein the live data is video data of a performance of an artist, the first terminal device is a terminal device of a user viewing the performance of the artist, and the second terminal device is a terminal device of a user viewing the performance of the artist and is the terminal device of the user different from the user of the first terminal device.

REFERENCE SIGNS LIST

1 INFORMATION PROCESSING SYSTEM
10 DISTRIBUTION SERVER
20 IMAGING DEVICE
30 TERMINAL DEVICE
11, 21, 31 COMMUNICATION UNIT
12, 22, 32 STORAGE UNIT
13, 23, 33 CONTROL UNIT
24, 36 SENSOR UNIT
25, 37 IMAGING UNIT
34 INPUT UNIT
35 OUTPUT UNIT
131 ACQUISITION UNIT
132 DATA CONTROL UNIT
133 GROUPING UNIT

The invention claimed is:

1. An information processing device that distributes live data to a first terminal device, the information processing device comprising:

acquisition circuitry configured to acquire information of a delay between the first terminal device that transmits interaction data with respect to the live data and the information processing device, or a delay between a second terminal device, which receives the interaction data from the first terminal device with respect to the live data, and the first terminal device; and control circuitry configured to perform control related to the interaction data from the first terminal device on a basis of the acquired information of the delay, wherein the control circuitry determines a position of the first terminal device in a virtual space shown in the first terminal device on a basis of the acquired information of the delay, and performs control related to the interaction data on a basis of the determined position.

2. The information processing device according to claim 1, wherein the acquisition circuitry acquires, from a range in the virtual space shown in the first terminal device which range is determined on a basis of the delay, information of a position of the first terminal device which position is selected by a user of the first terminal device, and the control circuitry performs the control related to the interaction data on a basis of the acquired information of the position.

3. The information processing device according to claim 1, wherein the interaction data is information related to a voice or a motion of a user of the first terminal device.

4. The information processing device according to claim 1, wherein the interaction data is a voice of a user of the first terminal device, and the control circuitry performs control related to volume of the voice of the user of the first terminal device on a basis of the acquired information of the delay.

5. The information processing device according to claim 1, wherein a plurality of the first terminal devices is present, the acquisition circuitry acquires a plurality of pieces of the information of the delay, and the control circuitry performs control of magnitude of a transmission delay of the interaction data from the first terminal device to the second terminal device on a basis of the acquired plurality of pieces of information of the delay.

6. The information processing device according to claim 5, wherein the control circuitry adds a delay amount determined on a basis of the acquired plurality of pieces of information of the delay to transmission of the interaction data.

7. The information processing device according to claim 1, wherein the control circuitry performs filtering processing on the interaction data on a basis of the acquired delay.

8. The information processing device according to claim 7, wherein the interaction data is a voice of a user of the first terminal device, and the control circuitry performs the filtering processing related to the voice with respect to the interaction data on a basis of the acquired delay.

9. The information processing device according to claim 8, wherein in a case where the acquired delay is lower than a predetermined threshold and volume of the voice is larger than predetermined volume, the control circuitry performs filtering processing of cutting a spoken voice.

10. The information processing device according to claim 1, further comprising a grouping circuitry that groups a plurality of the first terminal devices, wherein the control circuitry performs the control related to the interaction data for each of the groups.

11. The information processing device according to claim 10, wherein the grouping circuitry groups the plurality of first terminal devices on a basis of the information of the delay of each of the plurality of first terminal devices.

12. The information processing device according to claim 11, wherein the live data includes at least video data, the grouping circuitry groups the plurality of first terminal devices by applying the information of the delay to one or a plurality of reference values for grouping of the plurality of first terminal devices, and the one or plurality of reference values is a value in a unit of a number of frames of a video.

13. The information processing device according to claim 10, wherein grouping of the plurality of first terminal devices is performed on a basis of information of a connected network operator of each of the plurality of first terminal devices.

14. The information processing device according to claim 10, wherein grouping of the plurality of first terminal devices is performed on a basis of designation by a user of a predetermined one of the first terminal devices or the second terminal device.

15. The information processing device according to claim 10, wherein grouping of the plurality of first terminal devices is performed on a basis of real position information of each of the plurality of first terminal devices.

16. An information processing method executed by an information processing device that distributes live data to a first terminal device, the information processing method comprising:

acquiring information of a delay between the first terminal device that transmits interaction data with respect to the live data and the information processing device, or a delay between a second terminal device, which receives the interaction data from the first terminal device with respect to the live data, and the first terminal device;

performing control related to the interaction data from the first terminal device on a basis of the acquired information of the delay; and determining a position of the first terminal device in a virtual space shown in the first terminal device on a basis of the acquired information of the delay, and performing control related to the interaction data on a basis of the determined position.

17. An information processing system comprising:

a distribution server that distributes live data;

one or a plurality of first terminal devices that receives the live data and transmits interaction data with respect to the live data and a second terminal device that receives the interaction data from the first terminal device with respect to the live data, the information processing system further comprising:

acquisition circuitry configured to acquire information of a delay between the distribution server and the first terminal device or a delay between the second terminal device and the first terminal device; and control circuitry configured to perform control related to the interaction data from the first terminal device on a basis of the acquired information of the delay, wherein the control circuitry determines a position of the first terminal device in a virtual space shown in the first terminal device on a basis of the acquired information of the delay, and performs control related to the interaction data on a basis of the determined position.

18. The information processing system according to claim 17, wherein the live data is video data of a performance of an artist, the first terminal device is a terminal device of a user viewing the performance of the artist, and the second terminal device is a terminal device to output, to the artist, the interaction data from the first terminal device that is the terminal device of the user viewing the performance of the artist.

19. The information processing system according to claim 17, wherein the live data is video data of a performance of an artist, the first terminal device is a terminal device of a user viewing the performance of the artist, and the second terminal device is a terminal device of a user viewing the performance of the artist and is the terminal device of the user different from the user of the first terminal device.

* * * * *